(12) United States Patent
Hathaway et al.

(10) Patent No.: US 6,637,101 B2
(45) Date of Patent: Oct. 28, 2003

(54) COAXIAL CABLE PREPARATION TOOL

(75) Inventors: Rob Hathaway, Ivoryton, CT (US); Vinny Benevento, East Haven, CT (US); John Goldenberg, North Haven, CT (US)

(73) Assignee: Radio Frequency Systems, Inc., Meriden, CT (US)

( * ) Notice: Subject to any disclaimer, the term of this patent is extended or adjusted under 35 U.S.C. 154(b) by 0 days.

(21) Appl. No.: 09/886,118

(22) Filed: Jun. 22, 2001

(65) Prior Publication Data

US 2002/0194728 A1 Dec. 26, 2002

(51) Int. Cl.[7] .................................................. H05K 3/00
(52) U.S. Cl. ............................. 29/829; 29/745; 29/828; 29/758; 29/825; 30/500
(58) Field of Search ..................... 29/745, 828, 758, 29/825, 746, 750, 829; 30/500, 90.1, 90.2

(56) References Cited

U.S. PATENT DOCUMENTS

| | | | |
|---|---|---|---|
| 3,330,036 A | | 7/1967 | Mahoney |
| 4,317,279 A | * | 3/1982 | Smith et al. .................. 144/3.1 |
| 4,345,375 A | * | 8/1982 | Hayward ..................... 29/566.4 |
| 4,379,665 A | | 4/1983 | Hendershot et al. |
| 4,395,168 A | | 7/1983 | Vicari |
| 4,450,621 A | * | 5/1984 | Bianchi ........................ 269/87.3 |
| 4,459,881 A | | 7/1984 | Hughes, Jr. |
| 4,490,908 A | | 1/1985 | Tengler |
| 4,594,029 A | | 6/1986 | Michael, III |
| 4,706,384 A | | 11/1987 | Schreiber et al. |
| 4,719,697 A | | 1/1988 | Schwartzman et al. |
| 4,731,928 A | * | 3/1988 | Jackson ......................... 30/90.2 |
| 4,809,424 A | * | 3/1989 | Bianchi et al. ............... 29/564.2 |
| 4,987,801 A | | 1/1991 | Brown |
| 5,009,130 A | | 4/1991 | Bieganski |
| 5,036,734 A | | 8/1991 | Morrow |
| 5,105,542 A | | 4/1992 | Nakajima et al. |
| 5,487,220 A | | 1/1996 | Saitou |
| 5,511,305 A | * | 4/1996 | Garner ......................... 29/828 |
| 5,569,002 A | | 10/1996 | Kleine |
| 5,673,486 A | | 10/1997 | Brown |
| 5,713,132 A | | 2/1998 | Tarpill |
| 5,749,270 A | | 5/1998 | Bourbeau |
| 5,904,449 A | | 5/1999 | Satran et al. |
| 5,992,010 A | | 11/1999 | Zamanzadeh |
| 6,089,913 A | | 7/2000 | Holliday |
| 6,161,289 A | | 12/2000 | Alexander |
| 6,336,267 B1 | * | 1/2002 | Hoffa ........................ 29/33 M |
| 6,397,474 B1 | * | 6/2002 | Losinger ..................... 30/90.1 |

* cited by examiner

Primary Examiner—Joseph J. Hail, III
Assistant Examiner—Alvin J. Grant
(74) Attorney, Agent, or Firm—Sughrue Mion, PLLC

(57) ABSTRACT

This invention relates to an improved coaxial cable preparation tool (1) that is used to prepare a coaxial cable terminal end for connector installation. The tool comprises two stages. The first stage, the jacket stripper, is used to trim the cable jacket. The second stage (20), the cable trimmer, is used to trim the remaining center, the outer conductors and the foam insulation of the coaxial cable. The first stage (10) consists of a cup or cylinder (11) with an outer cylindrical wall (12). In addition, it also comprises a blade (13) and a scrap port (14). In addition, the first stage cylinder (11) has a bore (16) extending axially down its center. The diameter of the bore (16) is set to receive a coaxial cable. The second stage consists of a hub (21) (or cutter head), a collet bearing (22) and a body (23). In addition, like the first stage, it also contains blades (13) and scrap ports (14). The scrap ports or debris ports (14) allow trimmed cable media to escape from the bores in the tool.

41 Claims, 7 Drawing Sheets

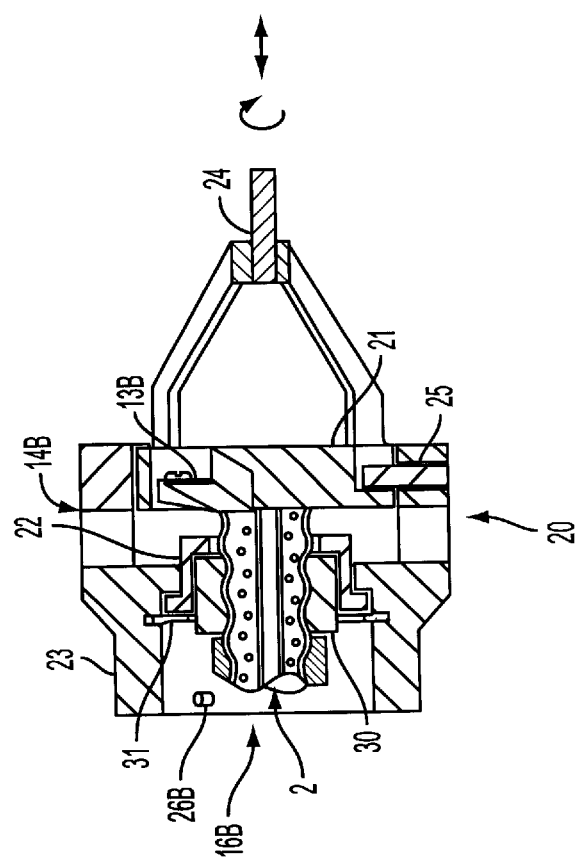
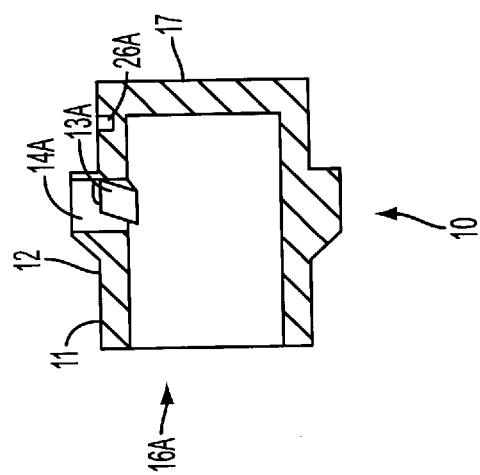
FIG. 1A
FIG. 1B

COAXIAL CABLE PREPARATION TOOL

FIELD OF INVENTION

This invention is related to the field of power operated rotary strippers. More particularly, this invention relates to a tool that will prepare the butt end of semi-rigid coaxial cable for connector installation in a rapid and consistent manner.

BACKGROUND OF INVENTION

Coaxial cable is used to transmit electrical signals. It comprises a center conductor, which is encapsulated by foam dielectric insulation. Furthermore, the foam dielectric material is overlaid with an outer conductor. Many times the outer conductor is an annular corrugated outer conductor or helically corrugated outer conductor. The entire assembly can be encased with an outer protective jacket. Coaxial connectors are used to connect coaxial cable to equipment to which it carries electrical signals to and from. Also, coaxial connectors are used to connect coaxial cables to each other.

To permit proper transmission of electrical signals, the coaxial connector is connected to the center and outer conductors of a coaxial cable. Therefore, before attaching the connector to an end of a coaxial cable, the end of a coaxial cable must be prepared. This involves stripping the coaxial cable's outer jacket and trimming the conductors and foam dielectric insulation. However, current methods for preparing semi-rigid coaxial cable for connector installation are slow and do not produce consistent results.

SUMMARY OF THE INVENTION

The present invention is a cable preparation tool, comprising a first stage and a second stage that is connected to the first stage. The first stage comprises a cylinder having a bore surrounded by an outer cylindrical wall. In addition, it comprises a base located on one end of the cylinder. A scrap port is located in the outer cylindrical wall and a blade is secured in the scrap port by a screw. The second stage comprises a body having a bore in its center and a hub located on an end of the body.

In another preferred embodiment, the present invention is a method of preparing a coaxial cable for connector installation, comprising the steps of inserting a cable preparation tool into an electric drill, actuating the drill and translating rotary motion of a second stage of the cable preparation tool to a first stage of the cable preparation tool. In addition, it comprises the steps of removing the coaxial cable's jacket by pushing the coaxial cable into the first stage. Next, the first stage is removed from the second stage. A collet is then installed onto an exposed cable outer conductor corrugation. Then the second stage of the tool is placed over the exposed cable and collet. Finally, the inner and outer conductors and the foam dielectric insulation of the cable are then trimmed.

BRIEF DESCRIPTION OF THE DRAWINGS

FIG. 1A is a drawing of the first stage of the improved coaxial cable preparation tool.

FIG. 1B is a drawing of the second stage of the improved coaxial cable preparation tool.

DETAILED DESCRIPTION OF THE INVENTION

Figure 2:
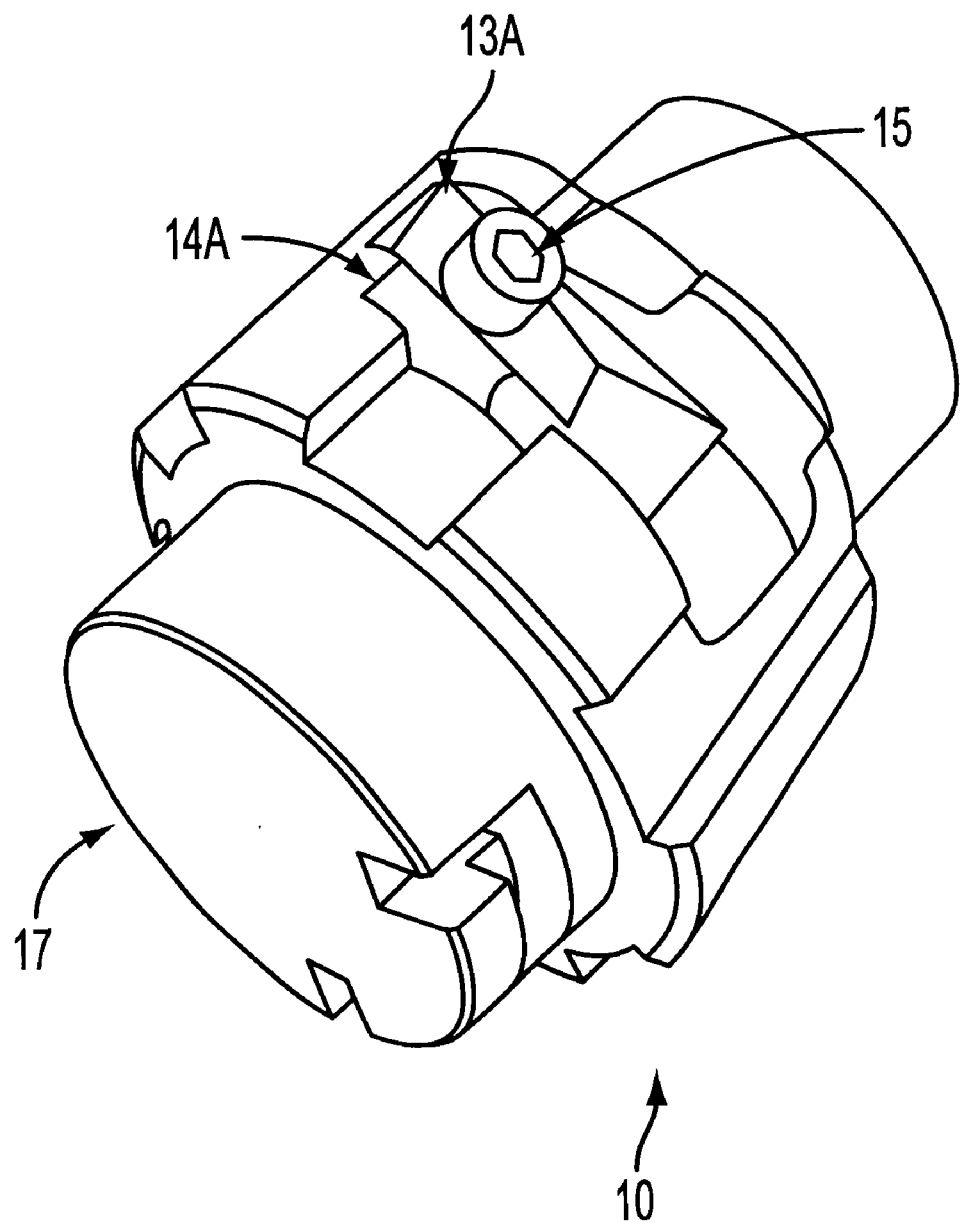
FIG. 2 is a view of stage one of the improved coaxial cable preparation tool showing the base of the cup.

This invention relates to an improved coaxial cable preparation tool (1) that is used to prepare a coaxial cable terminal end for connector installation. The tool comprises two stages (FIGS. 1A and 1B). The first stage (10), the jacket stripper, is used to trim the cable jacket. The first stage (10) consists of a cup or cylinder (11) with an outer cylindrical wall (12). (See FIG. 1A). In addition, it also comprises a blade (13A) and a scrap port (14A). The blade (13A) is mounted in the scrap port (14A). In a preferred embodiment, the blade (13A) is secured in the scrap port (14A) using socket-head cap screws (15). (See FIG. 2). However, other means of securing a blade (13A) can be used. Also in a preferred embodiment, the blades (13A) used in the present invention are hardened tool steel blades (13A). However, other types of blades (13A) can also be used.

Figure 3:
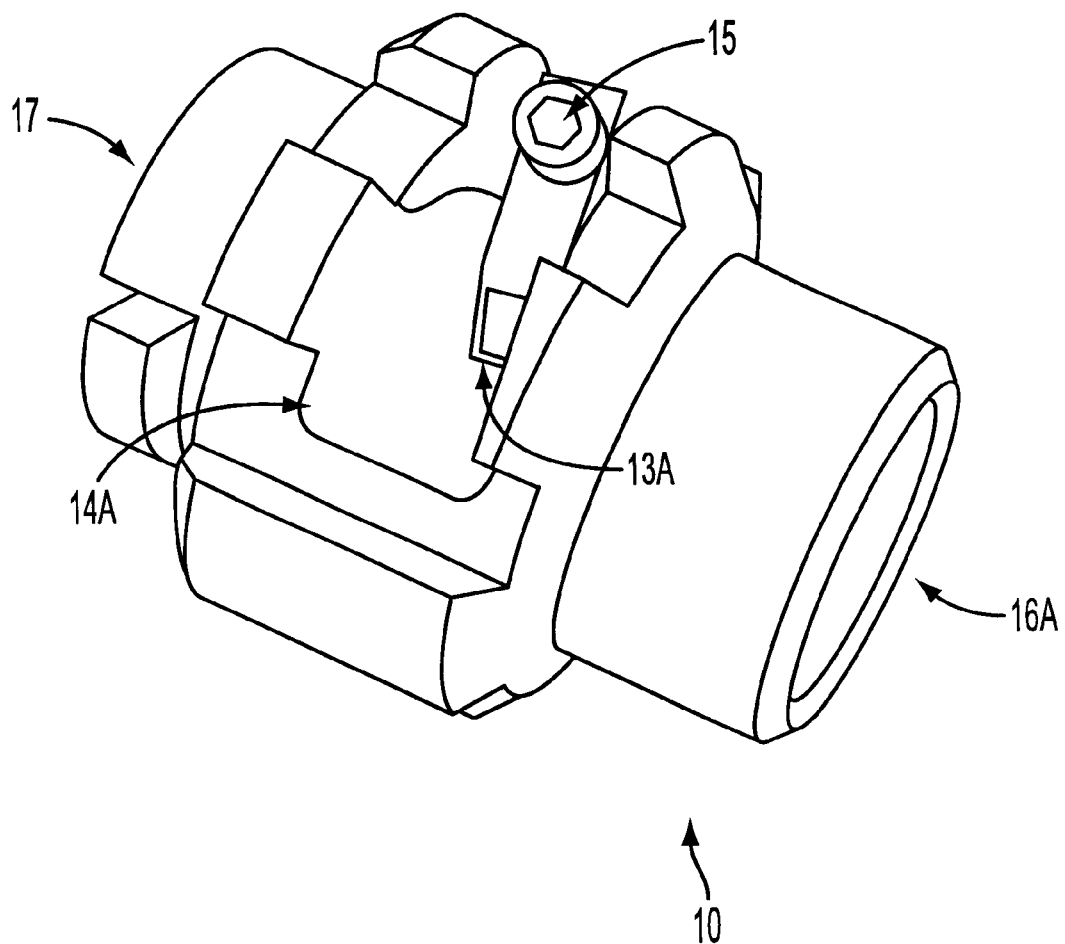
FIG. 3 is a view of stage one of the improved coaxial cable preparation tool showing the blade in the port.
Figure 4:
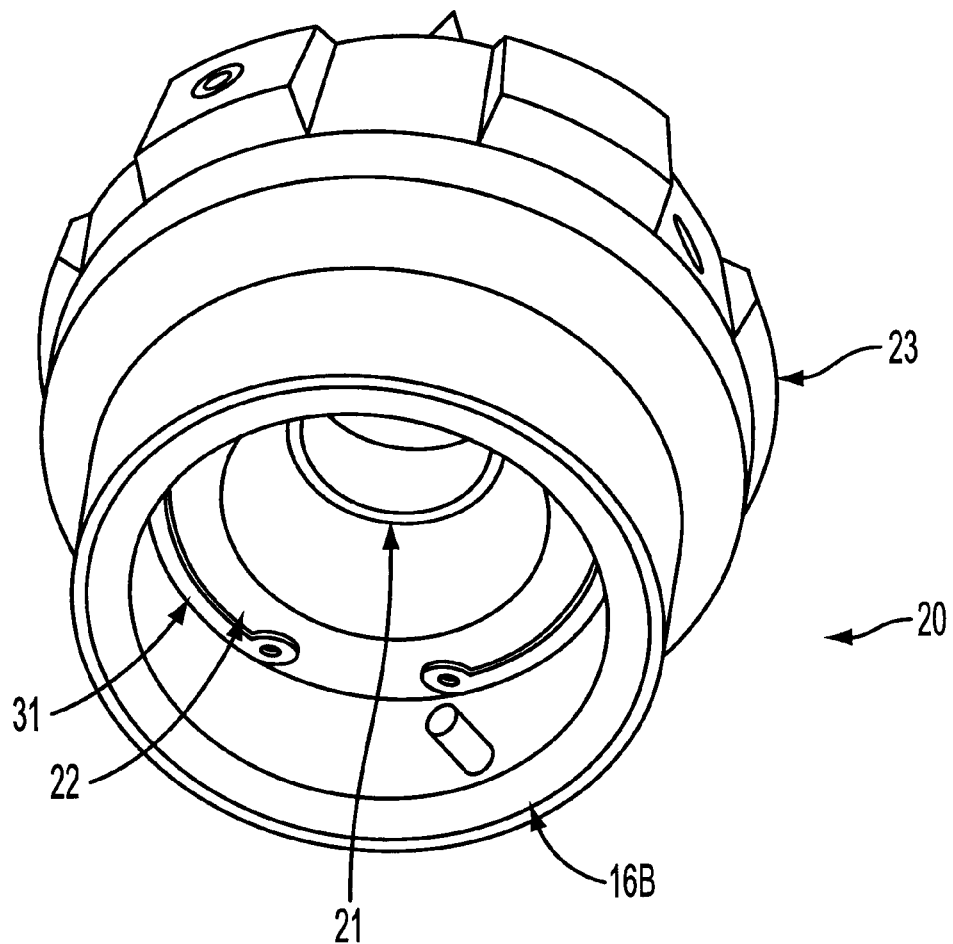
FIG. 4 is a view of stage two of the improved coaxial cable preparation tool showing the bore with a white collet bearing.

The first stage cylinder (11) has a bore (16A) extending axially down its center. The diameter of the bore (16A) is set to receive a coaxial cable. Extending into the cylinder (11) and communicating with the axial bore (16A) is the jacket trim port or scrap port or slot (14A) and jacket trim blade (13A) mounted in the jacket trim port (14A). (See FIGS. 2 and 3). The blade (13A) extends from the tangent of the axial bore (16A) radially inward into the axial bore (16A). The blade (13A) is accurately mounted in the slot (14A) in the outer cylindrical wall with screws (15). During operation (see below) the RF coaxial cable is pushed into the spinning bore (16A) of the first stage (10). The blade (13A) will remove the coaxial cable's jacket in a ribbon. The first cylindrical trim tool stage (10) will trim the cable jacket beyond the required amount for connector installation.

The second stage (20), the cable trimmer, (See FIG. 1B) is used to trim the remaining center, the outer conductors and the foam insulation of the coaxial cable. The second stage consists of a hub (21) (or cutter head), a collet bearing (22) and a body (23). (See FIG. 1B). In addition, like the first stage, it also contains a blade (13B) and a scrap port (14B). (See FIG. 1B). The scrap ports or debris ports (14A and 14B) allow trimmed cable media to escape from the bores in the tool.

Operation of the Improved Coaxial Cable Preparation Tool

Figure 5:
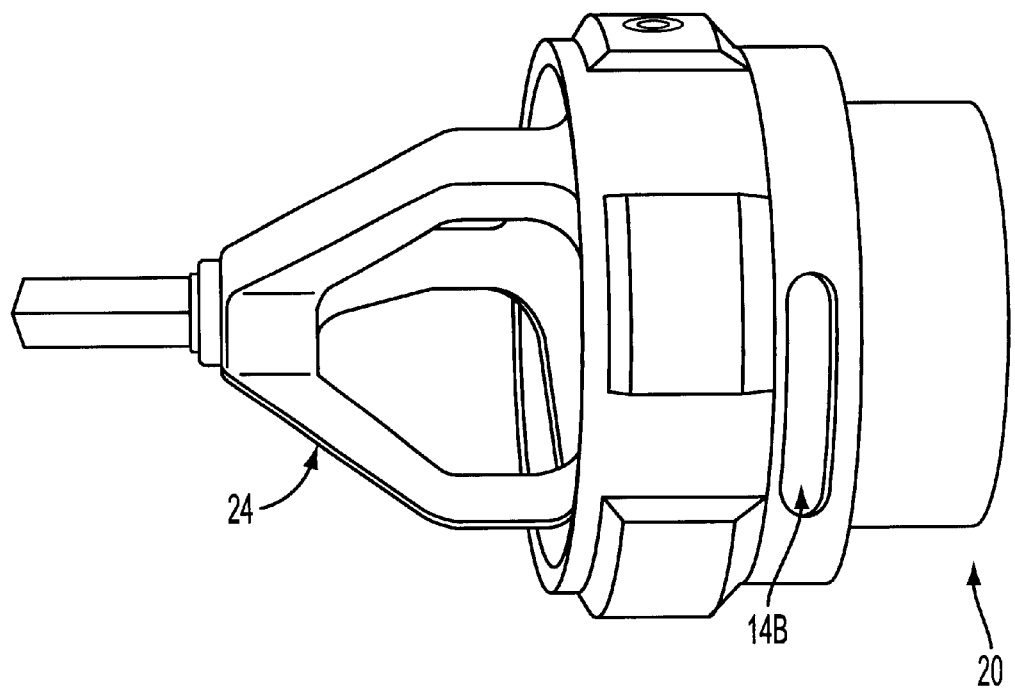
FIG. 5 is a view of stage two of the improved coaxial cable preparation tool showing the spindle.
Figure 6:
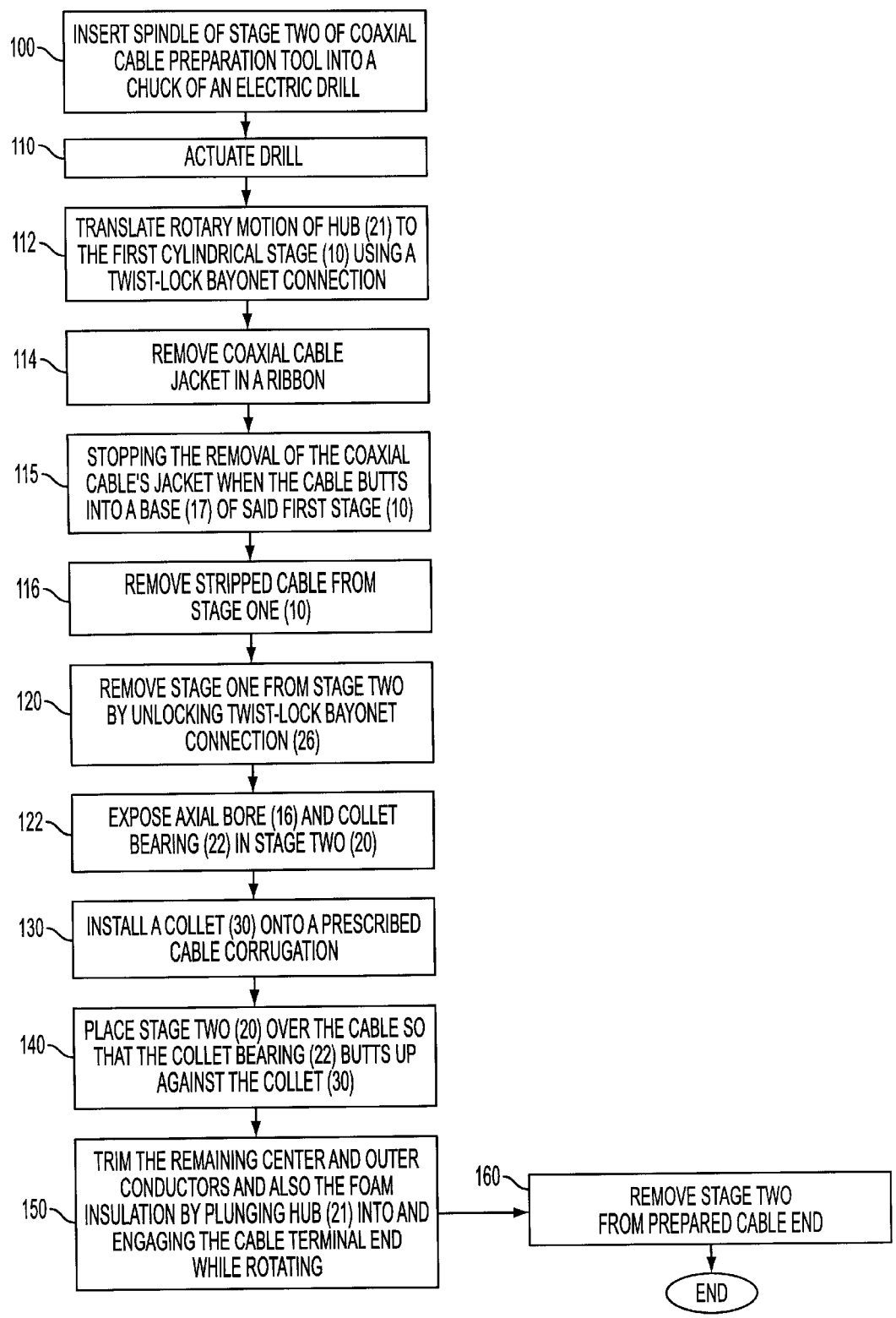
FIG. 6 is a flowcart of the operation of the improved coaxial cable preparation tool.
Figure 7:
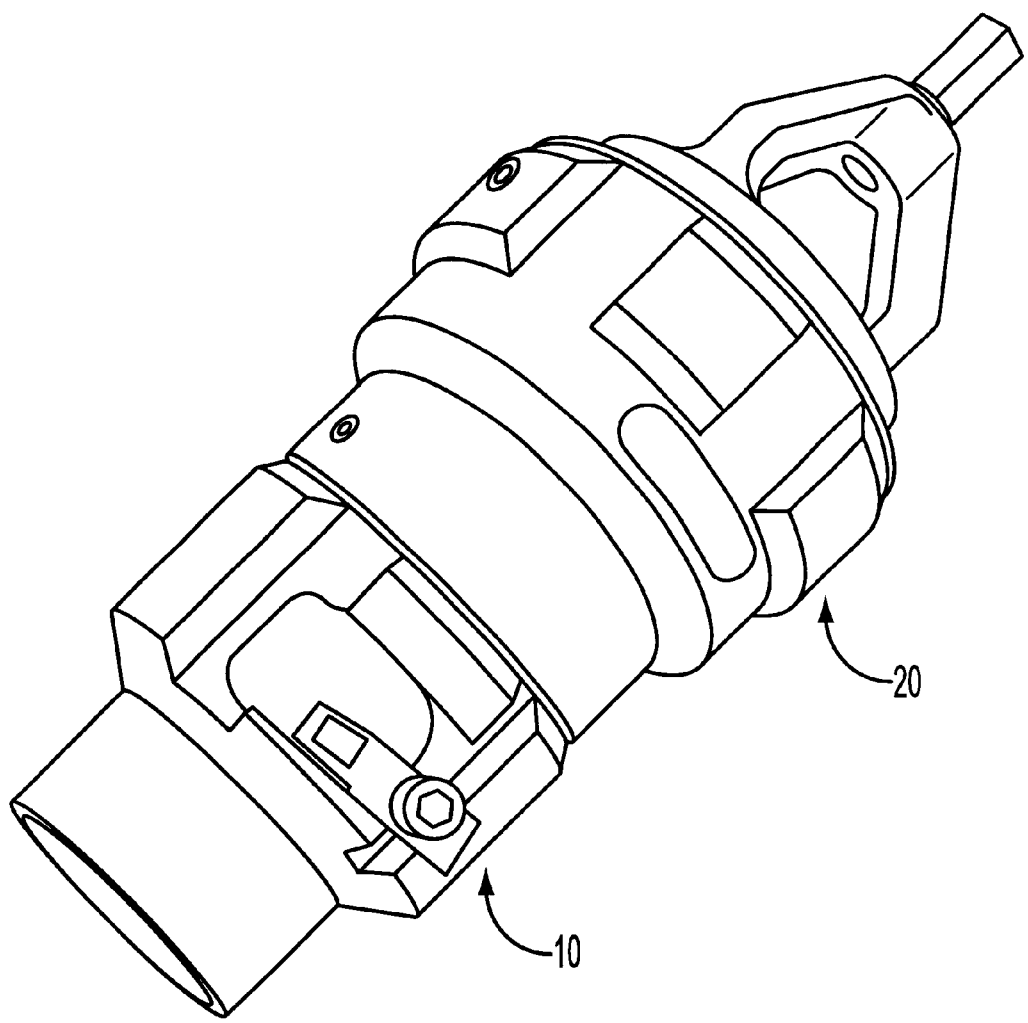
FIG. 7 is a view showing the assembled tool of the present invention with the first stage and the second stage connected together.

The hub has a spindle (24) extending from its rear or back face (See FIG. 5). It is inserted into the chuck of an electric drill (Step 100 see FIG. 6), much the same way that a drill bit is inserted into a drill. The tool rotates at approximately 400 RPM about the cable end when in use. FIG. 7 shows the assembled tool of the present invention with the first stage (10) and the second stage (20) (or stage one and stage two) connected together. In a preferred embodiment, a locking pin (25) (see FIG. 1B) transfers torque from the hub (21) to the body of the second stage (20), and allows the hub (21)

to translate in the body (23). In addition, the body (23) is connected to the first stage (10) via a twist-lock, or bayonet style connection (26) comprising a bayonet groove (26A) or female connector & a bayonet stud (26B) or male connector. (See FIGS. 1A and 1B). However, other types of connections can also be used to connect the first stage to the second stage. For example, a connection where the first stage (10) and the second stage (20) snap together can be used. In addition, the female connector (26A) can be located on said first stage (10) and said male connector (26B) can be located on said second stage (20) or vica versa. When the drill is actuated (Step 110), the bayonet (26) connection translates the rotary motion of the hub (21) to the first cylindrical stage (10) (Step 112). Therefore, when the drill is actuated, the cylinder (11), or first stage, rotates. The blade (13A) located in the first stage (10) removes the coaxial cable's jacket in a ribbon (Step 114). When the cable butts into the base (17) of the first stage (10), the trimming stops (see FIG. 7) (Step 115).

Next, the user removes the stripped cable from stage one (10) (Step 116). This is followed by removing stage one (10) from stage two (20) Vy unlocking the twist-lock bayonet style connection (Step 120). This exposes an axial bore (16A) and collet bearing (22) located within stage two (20) of the tool (Step 122). After this occurs, the user installs a collet (30) onto a prescribed cable outer conductor corrugation (Step 130). The collet is used to index the trimming of the cable. (The collet (30) is ordinarily supplied with the connector, or may be designed specifically for this tool if the connector does not require a collet). In a preferred embodiment, a locking spring (31) or retaining ring can be used to retain the collet bearing (22) within the second stage (Step 132). The spring (31) can be removed to replace a worn collet bearing (22) when maintenance is performed on the tool.

Next, the user places the second stage (20) of the tool over the cable so that the collet bearing (22) in the tool butts up against the collet (30) (Step 140). As discussed above, the hub (21) will trim the remaining center and outer conductors and also the foam insulation or dielectric insulation by plunging the hub (21) into and engaging the cable terminal end while rotating (Step 150). The second stage trim length is controlled by the collet bearing (22), which prevents the hub (21) from trimming any further. A debris port (14B) allow chips to escape during and after trimming.

As a result, the cable is consistently trimmed to a proper and consistent or repeatable length for connector installation relative to the cable corrugations and previous jacket trimming. Now, a connector can be installed over the cable. The user removes the tool stage two (20) from the cable by pulling the drill and the attached tool from the cable (Step 160). After cutting is complete, the user can clean the cable of debris to install the connector. After the first stage (10) is returned, the tool is ready for another trim.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:
1. A cable preparation tool, comprising:
a first stage; and
a second stage operably connected to the first stage, wherein said second stage is configured to perform a trimming operation when said first stage is removed.

2. The cable preparation tool, according to claim 1, wherein said second stage comprises:
a cylinder having a bore surrounded by an outer cylindrical wall;
a base located on one end of said cylinder;
a scrap port located in said outer cylindrical wall; and
a blade secured in said scrap port.

3. The cable preparation tool, according to claim 1, wherein said second stage comprises:
a body having a bore in its center, and
a hub located on an end of said body.

4. The cable preparation tool according to claim 1, further comprising a twist-lock connection, whereby said second stage is operably connected to said first stage.

5. The cable preparation tool according to claim 2, further comprising a screw to secure said blade in said scrap port.

6. The cable preparation tool according to claim 2, wherein said blade is a hardened steel tool blade.

7. The cable preparation tool according to claim 2, wherein said bore extends axially down a center of said cylinder.

8. The cable preparation tool, according to claim 2, wherein said second stage comprises:
a body having a bore in its center; and
a hub located on an end of said body.

9. The cable preparation tool according to claim 2, further comprising a twist-lock connection having groove located on said outer cylindrical wall and a stud located on said body, whereby said second stage is operably connected connected to said first stage by engaging said stud in said groove.

10. The cable preparation tool according to claim 3, wherein said second stage further comprises a spindle attached to a back of said hub, whereby said cable preparation tool can be inserted into an electric drill.

11. The cable preparation tool according to claim 3, further comprising a collet bearing mounted on said body before a front face of said hub.

12. The cable preparation tool according to claim 3, wherein said second stage further comprises:
a scrap port located in said body; and
a blade secured in said scrap port.

13. The cable preparation tool according to claim 4, wherein said twist-lock connection is a bayonet style twist-lock connection.

14. The cable preparation tool according to claim 8, wherein said second stage further comprises:
a spindle attached to a back face of said hub, whereby said cable preparation tool can be inserted into an electric drill.

15. The cable preparation tool according to claim 8, wherein said second stage further comprises:
a collet bearing mounted on said body before a front face of said hub.

16. The cable preparation tool according to claim 11, further comprising a locking spring to retain said collet bearing within said second stage.

17. The cable preparation tool according to claim 14, wherein said second stage further comprises:
a collet bearing mounted on said body before a front face of said hub.

18. The cable preparation tool according to claim 14, wherein said second stage further comprises:
a scrap port located in said body; and
a blade secured in said scrap port.

19. The cable preparation tool according to claim 14, further comprising a twist-lock connection having a groove located on said cuter cylindrical wall and a stud located on said body, whereby said second stage is operably connected to said first stage by engaging said stud in said groove.

20. The cable preparation tool according to claim 15, further comprising a locking spring to retain said collet bearing within said second stage.

21. The cable preparation tool according to claim 17, wherein said second stage further comprises:
   a scrap port located in said body; and
   a blade secured in said scrap port.

22. The cable preparation tool according to claim 17, further comprising a twist-lock connection having a groove located on said outer cylindrical wall and a stud located on said body, whereby said second stage is operably connected to said first stage by engaging said stud in said groove.

23. The cable preparation tool according to claim 17, further comprising a locking spring to retain said collect bearing within said second stage.

24. A method of preparing a coaxial cable for connector installation, comprising the following steps:
   inserting a cable preparation tool into an electric drill;
   actuating said drill;
   translating rotary motion of a second stage to a first stage;
   pushing the coaxial cable into said first stage;
   removing a jacket of the coaxial cable;
   removing said first stage from sad second stage;
   placing said second stage of the tool over the cable; and
   trimming foam insulation.

25. The method according to claim 24, wherein said step of removing the coaxial cable's jacket further comprises removing said jacket in a ribbon.

26. The method according to claim 24, further comprising the step of stopping the removal of the coaxial cable's jacket when the cable butts into a base of said first stage.

27. The method according to claim 24, wherein said step of translating the rotary motion of a second stage to a first stage is done by a twist-lock connection.

28. The method according to claim 24, wherein said second stage is removed form said second stage by unlocking a twist-lock connection.

29. The method according to step 24, wherein said second stage of the tool is placed over the cable so that a collet bearing in the tool butts up against a collet.

30. The method according to claim 24, wherein said step of trimming insulation further comprises trimming the steps of:
   trimming inner and outer conductors and foam insulation; and
   plunging into and engaging the cable terminal end while rotating.

31. The method according to claim 24, wherein said step of inserting a cable preparation tool into an electric drill further comprises the step of inserting a spindle into a chuck of an electric drill.

32. The method according to claim 24, further comprising the steps of:
   stopping the removal of the coaxial cable's jacket when the cable butts into a base of said first stage;
   translating the rotary motion of a second stage to a first stage using a twist-lock connection,
   removing said first stage from said second stage by unlocking a twist-lock connection.

33. The method according to claim 24, further comprising the steps of:
   installing a collet onto a cable corrugation, whereby said collet is used to index trimming of the cable;
   placing said second stage of the tool over the cable so that a collet bearing in the tool butts against said collet; and
   wherein said step of inserting a cable so that a collet bearing in the tool butts against said collet; and
   wherein said step of inserting a cable preparation tool into an electric drill further comprises the step of inserting a spindle into a chuck of an electric drill.

34. The method according to claim 24, further comprising the steps of:
   stopping the removal of the coaxial cable's jacket when the cable butts into a base of said first stage;
   translation the rotary motion of a second stage to a first stage using a twist-lick connection;
   removing said second stage from said first stage by unlocking a twist-lock connection;
   installing a collet onto a cable corrugation, whereby said collet is used to index trimming of the cable;
   placing said second stage of the tool over the cable so that a collet bearing in the tool butts against said collet; and
   wherein said step of inserting a cable preparation tool into an electric drill further comprises the step of inserting a spindle into a chuck of an electric drill.

35. The method according to claim 24, further comprising the step of placing an indexing collet onto the coaxial cable's outer conductor.

36. The method according to claim 27, wherein said twist-lock connection is a bayonet style connection.

37. The method according to claim 28, wherein said twist-lock connection is a bayonet style connection.

38. The method according to claim 32, wherein said twist-lock connection is a bayonet style connection.

39. The method according to claim 34, wherein said twist-lock connection is a bayonet style connection.

40. The method according to claim 34, wherein said twist-lock connection is a bayonet style connection.

41. The method according to claim 40, wherein said step of removing the coaxial cable's jacket further comprises removing said jacket in a ribbon.

* * * * *